US011489181B2

(12) United States Patent
Park et al.

(10) Patent No.: US 11,489,181 B2
(45) Date of Patent: Nov. 1, 2022

(54) PRESSURE CONTROL SYSTEM AND CONTROL METHOD OF FUEL CELL STACK

(71) Applicants: HYUNDAI MOTOR COMPANY, Seoul (KR); KIA MOTORS CORPORATION, Seoul (KR)

(72) Inventors: Jeong Kyu Park, Yongin-si (KR); Seung Yoon Lee, Seoul (KR); Sae Byeok Seung, Yongin-si (KR); Sang Chui Yeom, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 50 days.

(21) Appl. No.: 16/387,929

(22) Filed: Apr. 18, 2019

(65) Prior Publication Data
US 2020/0161682 A1 May 21, 2020

(30) Foreign Application Priority Data
Nov. 15, 2018 (KR) .......................... 10-2018-0141045

(51) Int. Cl.
*H01M 8/04746* (2016.01)
*H01M 8/0438* (2016.01)
(Continued)

(52) U.S. Cl.
CPC ... *H01M 8/04783* (2013.01); *H01M 8/04388* (2013.01); *H01M 8/04395* (2013.01);
(Continued)

(58) Field of Classification Search
CPC ......... H01M 8/04783; H01M 8/04388; H01M 8/04753; H01M 8/04432; H01M 8/04776;
(Continued)

(56) References Cited

U.S. PATENT DOCUMENTS

| 6,558,827 B1 * | 5/2003 | Reiser | H01M 8/04231 429/415 |
| 2002/0022161 A1 * | 2/2002 | Kurosaki | H01M 8/04425 429/446 |

(Continued)

FOREIGN PATENT DOCUMENTS

| JP | 4629986 B2 | 2/2011 |
| JP | 6187599 B2 | 8/2017 |

OTHER PUBLICATIONS

Liso et al., Thermal modeling and temperature control of a PEM fuel cell system for forklift applications, International Journal of Hydrogen Energy, 39, pp. 8410-8420 Apr. 2014. (Year: 2014).*

(Continued)

*Primary Examiner* — Christian Roldan
(74) *Attorney, Agent, or Firm* — Morgan, Lewis & Bockius LLP (57) ABSTRACT

A pressure control system of a fuel cell stack includes: an air supply control unit for controlling a revolutions per minute (RPM) of an air compressor for supplying air to a cathode side of the fuel cell stack based on a required output of the fuel cell stack; a hydrogen supply control unit for controlling a pressure at an anode side of the fuel cell stack with a target pressure based on the required output of the fuel cell stack; and a differential pressure control unit for controlling the air supply control unit or the hydrogen supply control unit to calculate a differential pressure between the anode side and the cathode side of the fuel cell stack, and to modify the target pressure or the RPM of the air compressor based on the calculated differential pressure.

6 Claims, 5 Drawing Sheets

(51) Int. Cl.
  *H01M 8/04089* (2016.01)
  *H01M 8/04082* (2016.01)
  *H01M 8/04223* (2016.01)
  *H01M 8/04537* (2016.01)
  *H01M 8/04119* (2016.01)

(52) U.S. Cl.
  CPC ... *H01M 8/04432* (2013.01); *H01M 8/04753* (2013.01); *H01M 8/04776* (2013.01)

(58) Field of Classification Search
  CPC ......... H01M 8/04395; H01M 8/04104; H01M 8/04335; H01M 8/04231; H01M 8/04619; H01M 8/04201; Y02E 60/50
  USPC .......................................................... 429/446
  See application file for complete search history.

(56) References Cited

U.S. PATENT DOCUMENTS

| | | | | |
|---|---|---|---|---|
| 2004/0018404 | A1* | 1/2004 | Kojima | H01M 8/04388 429/431 |
| 2012/0171590 | A1* | 7/2012 | Matsumoto | H01M 8/0432 429/442 |
| 2016/0156046 | A1* | 6/2016 | Asai | H01M 8/04388 429/413 |
| 2016/0380293 | A1* | 12/2016 | Son | H01M 8/0438 429/446 |
| 2017/0271701 | A1* | 9/2017 | Berlowitz | H01M 8/141 |

OTHER PUBLICATIONS

Sveshnikova et al., Effect of ambient temperature conditions on PEM fuel cell performance, Journal of Renewable and Sustainable Energy, 9, 044301-1 to 044031-13, Apr. 2017. (Year: 2017).*

* cited by examiner

FIG. 1

- PRIOR ART -

PRESSURE CONTROL SYSTEM AND CONTROL METHOD OF FUEL CELL STACK

CROSS REFERENCE TO RELATED APPLICATION

The present application claims priority of Korean Patent Application No. 10-2018-0141045 filed on Nov. 15, 2018 in the Korean Intellectual Property Office, the entire contents of which is incorporated herein for all purposes by this reference.

TECHNICAL FIELD

The present disclosure relates to a pressure control system and control method of a fuel cell stack, and more particularly, to a technique for maintaining a differential pressure between an anode side of a fuel cell stack and a cathode side thereof.

BACKGROUND

A fuel cell converts chemical energy into electrical energy by using the oxidation-reduction reaction of hydrogen and oxygen supplied from a hydrogen supply device and an air supply device, respectively, and includes a fuel cell stack for producing electrical energy, a cooling system for cooling it, and the like.

That is, hydrogen is supplied to an anode side of the fuel cell stack, and an oxidation reaction of hydrogen is performed at the anode to generate hydrogen ions (Proton) and electrons, and the hydrogen ions and electrons generated at this time move to a cathode through an electrolyte membrane and a separator, respectively. In the cathode, water is generated through an electrochemical reaction in which hydrogen ions and electrons moved from the anode and oxygen in the air participate, and electrical energy is generated from a flow of electrons.

The air supply to the cathode side of the fuel cell stack controls an air flow rate according to the output required by the fuel cell stack through a required torque of a motor and a required number of rotations thereof according to a depression amount of an accelerator pedal measured by an Accelerator Pedal Sensor (APS), and to determine a revolutions per minute (RPM) of an air compressor according to the calculated air flow rate. On the other hand, the hydrogen supply to the anode side of the fuel cell stack controls to follow a target pressure set according to an air flow rate and a temperature.

In particular, a pressure at the anode side of the fuel cell stack should be controlled to maintain a certain differential pressure with the pressure at the cathode side. That is for preventing durability from being reduced because oxygen is crossover from the cathode side to the anode side, thereby causing damage of carbon at the electrode of the anode side when the pressure at the cathode side becomes higher than that at the anode side.

Figure 1:
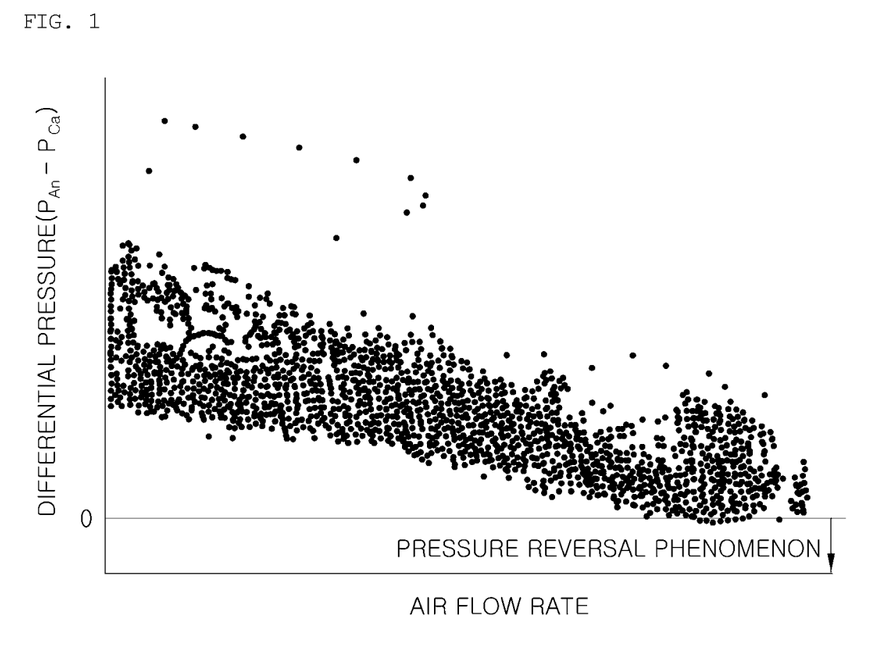
FIG. 1 is a graph illustrating a change in a differential pressure with respect to an air flow rate according to the related art.

FIG. 1 is a graph illustrating a change in a differential pressure with respect to an air flow rate according to related art.

Referring to FIG. 1, a differential pressure varies while the air flow rate varies according to the air flow rate at the cathode side varying from time to time, and accordingly, an RPM of an air compressor, a target pressure at the anode side, and a reaction speed thereto become different, and the like.

In addition, the fluctuation of the differential pressure is large even at the same air flow rate due to the variation of the pressure at the anode side by the opening of a purge valve and a drain valve disposed in a hydrogen supply line for supplying hydrogen to the fuel cell stack, or the like. That is, a differential pressure may be excessively generated or become extremely small.

In particular, the differential pressure obtained by subtracting the pressure at the cathode side from the pressure at the anode side is not normally controlled, and thereby, a duration in which a pressure reversal phenomenon having a negative value smaller than 0 may occur.

Therefore, there is a need in the field for a technique which can properly maintain the differential pressure between the pressure at the anode side of the fuel cell stack and the pressure at the cathode side thereof.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

The present disclosure is intended to solve the above problem, and an object of the present disclosure is to provide a pressure control for measuring the differential pressure between an anode side of a fuel cell stack and a cathode side thereof, and based on the above, modifying the target pressure of hydrogen supply or the RPM of an air compressor.

A pressure control system of a fuel cell stack according to an exemplary embodiment of the present disclosure may comprise: an air supply control unit for controlling a revolutions per minute (RPM) of an air compressor for supplying air to a cathode side of the fuel cell stack based on a required output of the fuel cell stack; a hydrogen supply control unit for controlling a pressure at an anode side of the fuel cell stack to be a first target pressure based on the required output of the fuel cell stack; and a differential pressure control unit for controlling the air supply control unit or the hydrogen supply control unit to calculate a differential pressure between the anode side and the cathode side of the fuel cell stack, and to modify the first target pressure or the RPM of the air compressor based on the differential pressure.

The hydrogen supply control unit may control the pressure at the anode side of the fuel cell stack through a hydrogen supply valve and an ejector interposed between a hydrogen supply line and a hydrogen tank for supplying hydrogen to the fuel cell stack.

The pressure control system may further include: a first pressure sensor for measuring a pressure at an inlet of the anode side of the fuel cell stack; and a second pressure sensor for measuring a pressure at an inlet of the cathode side of the fuel cell stack, and the differential pressure control unit may calculate the differential pressure by subtracting the pressure at the inlet of the cathode side from the pressure at the inlet of the anode side.

The differential pressure control unit may modify the first target pressure to be a second target pressure by adding a corrected pressure, which has the differential pressure as a variable, to the first target pressure, when the differential pressure is smaller than a first pressure.

The pressure control system may further include: a purge valve disposed at a fluid flow position between the anode side and the cathode side of the fuel cell stack; and a drain valve disposed at a fluid flow position between the anode side and the cathode side of the fuel cell stack, and the differential pressure control unit may block an opening of the purge valve or the drain valve when the differential pressure is smaller than a second pressure, which is predetermined to be smaller than the first pressure.

The differential pressure control unit may modify the RPM of the air compressor to increase a rising gain value of the RPM of the air compressor or an air supply Stoichiometry Ratio (SR) when the differential pressure exceeds a third pressure.

A pressure control method of a fuel cell stack according to another exemplary embodiment of the present disclosure may comprise steps of: controlling a revolutions per minute (RPM) of an air compressor for supplying air to a cathode side of the fuel cell stack and controlling a pressure of an anode side of the fuel cell stack to be a first target pressure based on a required output of the fuel cell stack; calculating a differential pressure between the anode side of the fuel cell stack and the cathode side thereof; and modifying the first target pressure or the RPM of the air compressor based on the differential pressure.

In the step of controlling, the RPM of the air compressor may be calculated by an air flow rate according to the required output of the fuel cell stack.

In the step of controlling, the first target pressure may be calculated by a predetermined pressure map according to an air flow rate and an air temperature according to the required output of the fuel cell stack.

The step of calculating may measure pressures at inlets of the anode side and the cathode side of the fuel cell stack by using pressure sensors, respectively, and may calculate the differential pressure by subtracting the pressure at the inlet of the cathode side from the pressure at the inlet of the anode side.

The step of modifying may include modifying the first target pressure to be a second target pressure by adding a corrected pressure, which has the differential pressure as a variable, to the first target pressure, when the calculated differential pressure is smaller than a first pressure.

The pressure control method may further include, after the step of modifying, a step of blocking an opening of a purge valve or a drain valve disposed at a fluid flow position between the anode side and the cathode side of the fuel cell stack, when the differential pressure is smaller than a second pressure, which is predetermined to be smaller than the first pressure.

The step of modifying may include modifying the RPM of the air compressor to increase a rising gain value of the RPM of the air compressor or an air supply Stoichiometry Ratio (SR), when the differential pressure exceeds a third pressure.

The step of modifying may include modifying the RPM of the air compressor only when the RPM of the air compressor increases.

According to the pressure control system and control method of the fuel cell stack of the present disclosure, it is possible to uniformly maintain the differential pressure between the anode side of the fuel cell stack and the cathode side thereof while reducing the fluctuation thereof.

In addition, it is possible to prevent the occurrence of the pressure reversal phenomenon in which the pressure at the cathode side of the fuel cell stack becomes higher than that at the anode side thereof, thereby improving durability.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Specific structural and functional descriptions of the embodiments of the present disclosure disclosed in the specification or application are only for the purpose of illustrating the embodiments of the present disclosure, and the embodiments in accordance with the present disclosure may be embodied in various forms and should not be construed as limited to the embodiments set forth in the specification or application.

Various modifications and various forms may be made in the embodiments according to the present disclosure, so that specific embodiments are illustrated in the drawings and described in detail in the specification or application. It should be understood, however, that it is not intended to limit the embodiments in accordance with the concepts of the present disclosure to the particular disclosed forms, but includes all modifications, equivalents, and alternatives falling within the sprit and technical scope of the present disclosure.

The terms "first" and/or "second," and the like may be used to illustrate various components, but the components should not be limited by the terms. The terms are used to differentiate one element from another, for example, a first component may be referred to as a second component, and similarly, the second component may be also referred to as the first component without departing from claims in accordance with the concepts of the present disclosure.

It will be understood that when an element is referred to as being "connected" or "coupled" to another element, it may be "directly connected" or "coupled" to the other element, but also to the other element with other elements interposed therebetween. On the other hand, it should be understood that any configuration element has no other element in between the time stated that "directly connected" or "directly coupled" to another element. Other expressions that describe the relationship between elements, such as "between" and "directly between" or "adjacent to" and "directly adjacent to" should be interpreted as well.

The terminology used the specification is for the purpose of describing particular embodiments only and is not intended to limit the present disclosure. The singular forms are intended to include the plural forms as well, unless the context clearly indicates otherwise. In the specification, it will be further understood that the terms "comprises" or "includes," and the like specify the presence of stated features, integers, steps, operations, elements, components or combination thereof, but do not preclude the presence or addition of one or more other features, integers, steps, operations, elements, components, or combination thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the specification.

Hereinafter, exemplary embodiments of the present disclosure will be described in detail with reference to the accompanying drawings. The same reference numerals denoted in each drawing represent the same members.

Figure 2:
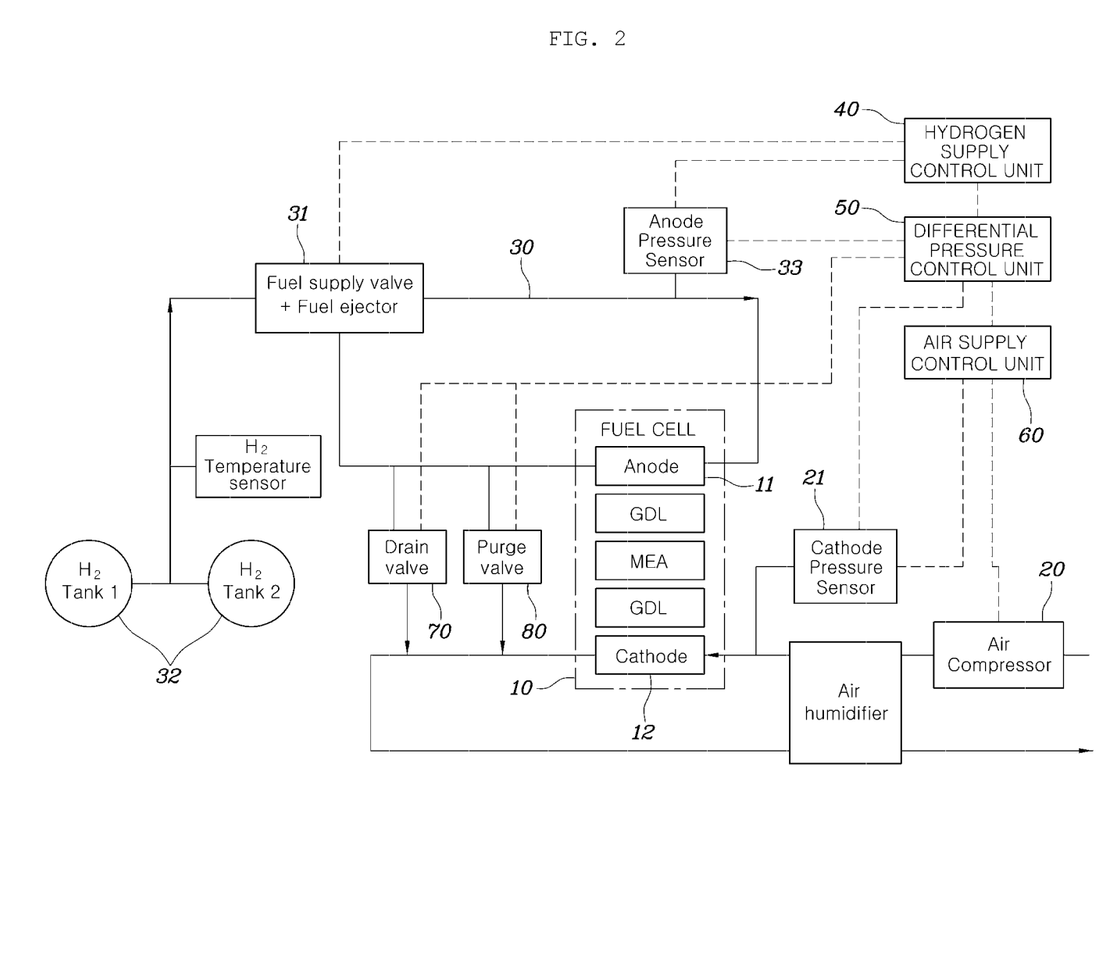
FIG. 2 is a block diagram of a pressure control system of a fuel cell stack according to an embodiment of the present disclosure.

FIG. 2 is a block diagram of a pressure control system of a fuel cell stack 10 according to an embodiment of the present disclosure.

Referring to FIG. 2, a pressure control system of a fuel cell stack 10 according to an embodiment of the present disclosure includes an air supply control unit 60 for controlling a revolutions per minute (RPM) of an air compressor 20 for supplying air to a cathode 12 side of the fuel cell stack 10 based on the required output of the fuel cell stack 10; a hydrogen supply control unit 40 for controlling the pressure at an anode 11 side of the fuel cell stack 10 with a target pressure based on the required output of the fuel cell stack 10; and a differential pressure control unit 50 for controlling the air supply control unit 60 or the hydrogen supply control unit 40 in order to calculate the differential pressure between the anode 11 side of the fuel cell stack 10 and the cathode 12 side thereof, and to modify the target pressure or the RPM of the air compressor 20 based on the calculated differential pressure.

The fuel cell stack 10 receives air at the cathode 12 side, and receives hydrogen at the anode 11 side to generate power through the chemical reaction in a Membrane Electrode Assembly (MEA).

The air compressor 20 supplies the outside air to the cathode 12 side of the fuel cell stack 10. In particular, the air supply control unit 60 controls the RPM of the air compressor 20 based on the required output of the fuel cell stack 10. When the required output of the fuel cell stack 10 increases as the required power of a motor electrically connected to the fuel cell stack 10 increases or the charge amount of a high-voltage battery decreases, the air supply control unit 60 controls to increase the RPM of the air compressor 20. The required power of the motor may be increased or decreased by reflecting the will of the user.

Specifically, an air flow rate of the fuel cell stack 10 may be varied according to the required output of the fuel cell stack 10, and the RPM of the air compressor 20 may be varied by the varied air flow rate. In particular, the RPM of the air compressor 20 may be determined by a predetermined RPM map.

In addition, the air supply pressure as well as the air flow rate may also be determined, such that the air supply pressure may be controlled by the opening control of a pressure control valve disposed at the outlet of the cathode 12 side of the fuel cell stack 10.

In addition, hydrogen is supplied to the anode 11 side of the fuel cell stack 10 through a hydrogen supply line 30. In particular, the hydrogen supply line 30 may recirculate it from the outlet of the fuel cell stack 10 back to the inlet of the fuel cell stack 10, and may recirculate it by further receiving hydrogen from a hydrogen tank at the middle that is recirculated from the outlet of the fuel cell stack 10.

The hydrogen supply control unit 40 controls the pressure at the anode 11 side of the fuel cell stack 10 with the target pressure based on the required output of the fuel cell stack 10. The target pressure is determined by a predetermined pressure map, and the predetermined pressure map may be predetermined to be varied by the air flow rate and the temperature, and the like according to the required output of the fuel cell stack 10. Herein, the temperature may be the temperature of the air received from the outside or the outside temperature.

The differential pressure control unit 50 may calculate the differential pressure between the anode 11 side and the cathode 12 side of the fuel cell stack 10. The differential pressure is a difference between the pressure at the anode 11 side of the fuel cell stack 10 and the pressure at the cathode 12 side thereof. The differential pressure control unit 50 may control the air supply control unit 60 or the hydrogen supply control unit 40 in order to modify the target pressure or the RPM of the air compressor 20 based on the calculated differential pressure.

As a result, it is possible to maintain the differential pressure between the anode 11 side of the fuel cell stack 10 and the cathode 12 side thereof in an appropriate range without being greatly changed, and to prevent the pressure reversal phenomenon, thereby improving the durability of the fuel cell stack 10.

The hydrogen supply control unit 40, the air supply control unit 60 or the differential pressure control unit 50 may be part of a fuel cell vehicle control unit (FCU) such as an Electronic Control Unit (ECU), or may be a lower control unit of the fuel cell vehicle control unit (FCU).

The hydrogen supply control unit 40 may control the pressure of the anode 11 side of the fuel cell stack 10 through a hydrogen supply valve and an ejector 31 interposed between the hydrogen supply line 30 for supplying hydrogen to the fuel cell stack 10 and the hydrogen tank.

The hydrogen supply valve and the ejector 31 are interposed between the hydrogen supply line 30 and the hydrogen tank, and control the hydrogen supply from the hydrogen tank to the hydrogen supply line 30. The hydrogen supply control unit 40 may control the hydrogen supply valve and the ejector to control the pressure at the anode 11 side of the fuel cell stack 10.

The pressure control system of the fuel cell stack 10 may further include a first pressure sensor 33 for measuring the pressure at the inlet of the anode 11 side of the fuel cell stack 10; and a second pressure sensor 21 for measuring the pressure at the inlet of the cathode 12 side of the fuel cell stack 10. The differential pressure control unit 50 may calculate the differential pressure by measuring the pressures at the inlets of the anode 11 side of the fuel cell stack 10 and the cathode 12 side thereof measured in the first pressure sensor 33 and the second pressure sensor 21, respectively, and subtracting the pressure at the inlet of the cathode 12 side from the pressure at the inlet of the anode 11 side.

That is, the first pressure sensor 33 may measure the pressure at the inlet received into the anode 11 side through the hydrogen supply valve among the anode 11 side of the fuel cell stack 10. The second pressure sensor 21 may measure the pressure at the inlet received into the cathode 12 side of the fuel cell stack 10 from the air compressor 20 among the cathode 12 side of the fuel cell stack 10. As a result, the oxygen that is crossover inside the fuel cell stack 10 is moved by the differential pressure through the MEA, such that it is possible to more accurately estimate the differential pressure affecting durability.

The pressure control system of the fuel cell stack 10 may further include a purge valve 80 disposed at a fluid flow position between the anode 11 side and the fuel cell stack 10 to the cathode 12 side thereof; and a drain valve 70 disposed at a fluid flow position between the anode 11 side of the fuel cell stack 10 and the cathode 12 side thereof.

The purge valve 80 may be opened for a predetermined period and a predetermined holding time to purge the gas containing the impurities of the hydrogen supply line 30 to the outside. In particular, the purge valve 80 may be disposed at a fluid flow position between the outlet of the anode 11 side of the fuel cell stack 10 of the hydrogen supply line 30 and the outlet of the cathode 12 side of the fuel cell stack 10.

The drain valve 70 may be disposed at a position connected from a water trap (not illustrated) for collecting water from the hydrogen supply line 30 disposed at the outlet of the anode 11 side of the fuel cell stack 10 to the outlet of the cathode 12 side of the fuel cell stack 10. The drain valve 70 may measure the amount of water collected in the water trap (not illustrated) by a level sensor (not illustrated) to discharge it to the outlet of the cathode 12 side of the fuel cell stack 10.

The differential pressure control unit 50 may modify the target pressure in order to add a corrected pressure, which is determined by the calculated differential as a variable, to an existing target pressure when the calculated differential pressure is smaller than a first predetermined pressure.

The differential pressure control unit 50 may block an opening of the purge valve 80 or the drain valve 70 when the calculated differential pressure is smaller than a second pressure that is predetermined to be smaller than the first pressure.

The differential pressure control unit 50 may modify the RPM of the air compressor 20 in order to increase a rising gain value of the RPM of the air compressor 20 or an air supply Stoichiometry Ratio (SR) when the calculated differential pressure exceeds a third pressure.

A specific control method will be described in connection with the following control method.

Figure 3:
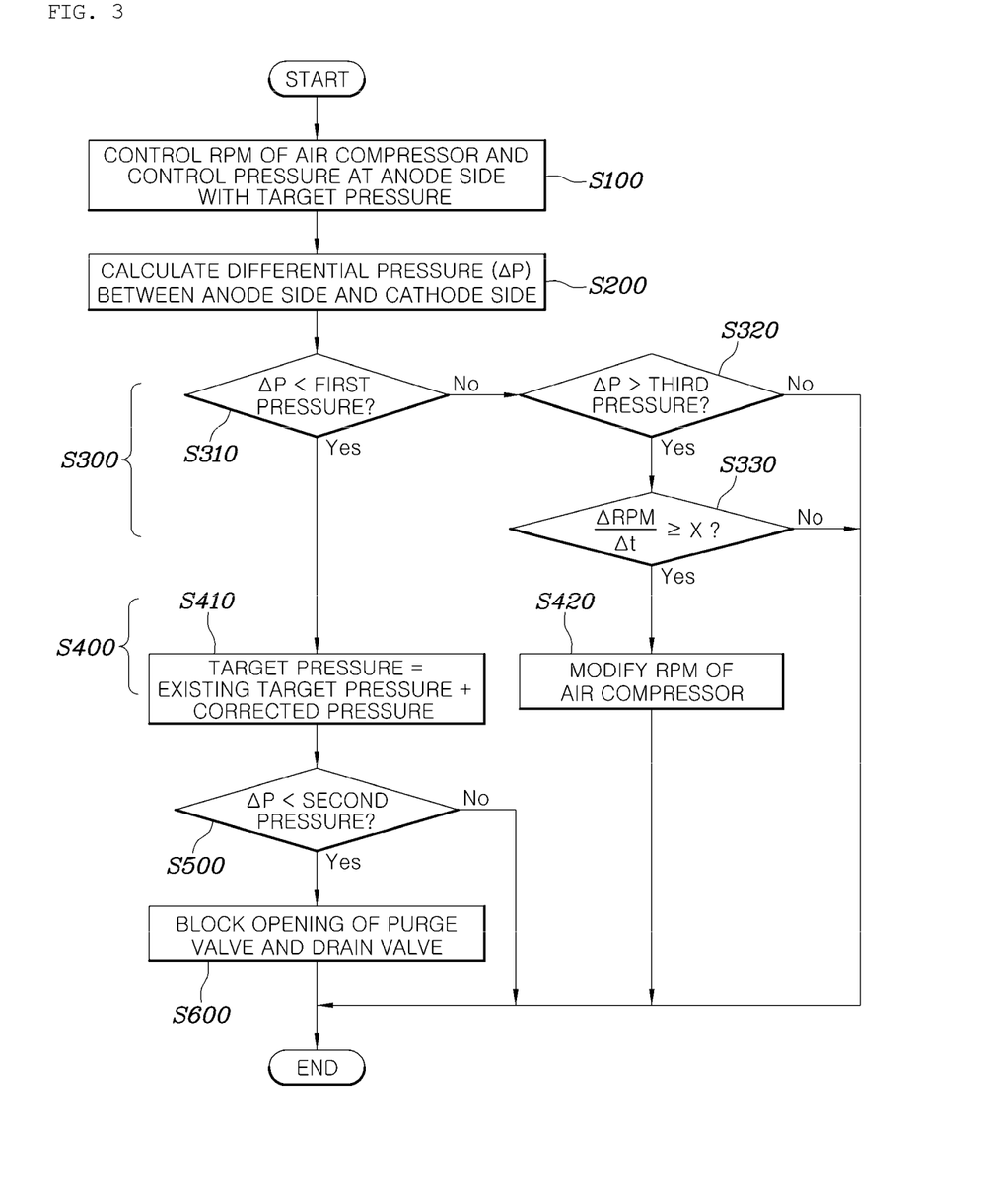
FIG. 3 is a flowchart of a pressure control method of the fuel cell stack according to an embodiment of the present disclosure.

FIG. 3 is a flowchart of a pressure control method of the fuel cell stack 10 according to an embodiment of the present disclosure.

Further referring to FIG. 3, a pressure control method of the fuel cell stack 10 according to an embodiment of the present disclosure includes controlling the RPM of the air compressor 20 for supplying air to the cathode 12 side of the fuel cell stack 10 and the pressure of the anode 11 side of the fuel cell stack 10 with the target pressure based on the required output of the fuel cell stack 10 (S100); calculating the differential pressure between the anode 11 side of the fuel cell stack 10 and the cathode 12 side thereof (S200); and modifying the target pressure or the RPM of the air compressor 20 based on the calculated differential pressure (S300, S400).

In the controlling the RPM of the air compressor 20 and hydrogen supply S100, the RPM of the air compressor 20 may be calculated by the air flow rate according to the required output of the fuel cell stack 10. In particular, the air flow rate supplied to the fuel cell stack 10 may be proportional to the required output of the fuel cell stack 10, and the RPM of the air compressor 20 may be proportional to the air flow rate. In particular, the RPM of the air compressor 20 may be determined by a predetermined RPM map according to the required air flow rate.

In the controlling the RPM of the air compressor 20 and hydrogen supply (S100), the target pressure may be calculated by a predetermined pressure map according to the air flow rate and the air temperature according to the required output of the fuel cell stack 10. The air temperature may be the outside air temperature or the temperature of the air received into the air compressor 20. The predetermined pressure map may be predetermined so that the target pressure maintains the differential pressure rather than the pressure at the cathode 12 side considering the pressure at the cathode 12 side of the fuel cell stack 10.

It is possible to control so that the pressure at the anode 11 side of the fuel cell stack 10 follows the target pressure. In particular, the pressure at the anode 11 side of the fuel cell stack 10 may be controlled through the feedback control for feeding back the sensing value of the first pressure sensor 33 for measuring the pressure at the inlet of the anode 11 side of the fuel cell stack 10.

As a result, it is possible to reflect the output required in the fuel cell stack 10, thereby maintaining the differential pressure between the anode 11 side and the cathode 12 side while generating power of the fuel cell stack 10.

The calculating the differential pressure (S200) may calculate the differential pressure by measuring the pressures at the inlets of the anode 11 side of the fuel cell stack 10 and the cathode 12 side thereof, respectively, by using a pressure sensor, and subtracting the pressure at the inlet of the cathode 12 side from the pressure at the inlet of the anode 11 side. The pressure sensor may be the first pressure sensor 33 of the system and the second pressure sensor 21 thereof.

The modifying the target pressure or the RPM of the air compressor 20 (S400) may control to divide it into a plurality of control modes based on the calculated differential pressure S300 in order to modify the target pressure or the RPM of the air compressor 20.

The differential pressure obtained by subtracting the pressure at the inlet of the cathode 12 side from the pressure at the inlet of the anode 11 side may be predetermined to a specific pressure of a positive value that is an ideal differential pressure between the anode 11 side and the cathode 12 side. The specific pressure may also be maintained at a certain value, and may be predetermined to be increased when the outside air temperature is a low temperature of a predetermined temperature or less or the outside air pressure is a low pressure of a predetermined pressure or less, or the like in a low flow rate control in which the required air amount is low.

In particular, the specific pressure may be included in a range of a first predetermined pressure or more and a third predetermined pressure or less. The first pressure and the third pressure may be values that are spaced apart from each other to have an appropriate range at a specific pressure. That is, a range of the first predetermined pressure or more and the third predetermined pressure or less may correspond to a normal range, thereby maintaining the target pressure or the RPM of the air compressor 30 without modification.

When the calculated differential pressure is smaller than the first predetermined pressure (S310), the modifying the target pressure or the RPM of the air compressor 20 (S400) may modify the target pressure in order to add a corrected pressure, which is determined by the calculated differential pressure as a variable, to an existing target pressure (S410).

In particular, the corrected pressure may be determined to increase as the calculated differential pressure becomes smaller than the first pressure.

Figure 4:
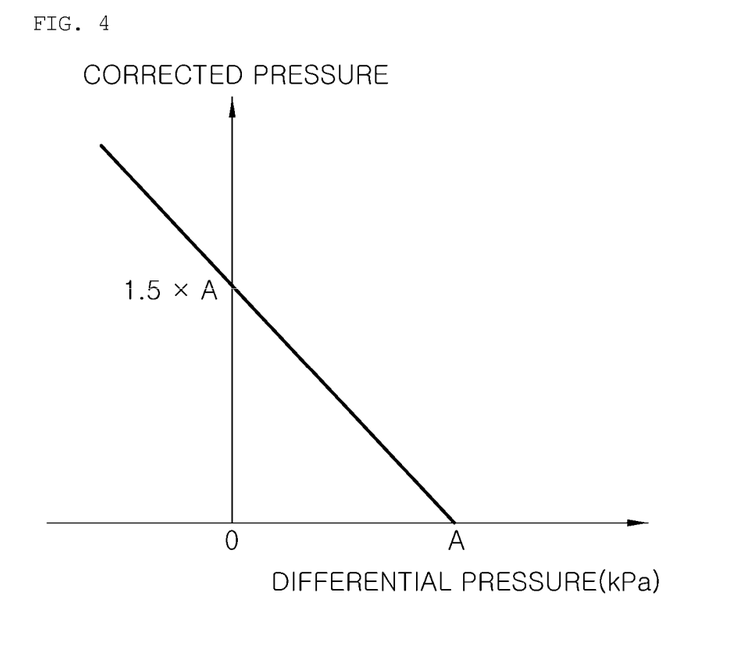
FIG. 4 is a graph of a corrected pressure having the differential pressure as a variable according to an embodiment of the present disclosure.

FIG. 4 is a graph of the corrected pressure having a differential pressure as a variable according to an embodiment of the present disclosure.

Further referring to FIG. 4, the corrected pressure may be determined to increase as the calculated differential pressure ΔP becomes a larger difference from the first pressure A. The corrected pressure equation according to FIG. 4 is as follows:

$$\text{Corrected pressure} = 1.5 \times (A - \Delta P).$$

That is, the corrected pressure may be set to be proportional to the difference between the first pressure and the differential pressure.

Referring back to FIG. 3, the pressure control method of the fuel cell stack 10 may further include blocking an opening of the purge valve 80 or the drain valve 70 disposed at a fluid flow position between the anode 11 side of the fuel cell stack 10 and the cathode 12 side thereof (S600), after the modifying the target pressure or the RPM of the air compressor 20 (S400), when the calculated differential pressure is smaller than the second pressure that is predetermined to be smaller than the first pressure (S500).

The second pressure is predetermined to be smaller than the first pressure, and in particular, may be predetermined to a pressure that is likely to cause the pressure reversal phenomenon in which the pressure at the cathode 12 side is greater than the pressure at the anode 11 side.

When the differential pressure between the cathode 12 side and the anode 11 side is very small or the pressure reversal phenomenon occurs, it may be controlled in an emergency operation control mode. In particular, in this case, there occurs the possibility of flowing back air from the cathode 12 side to the anode 11 side when the purge valve 80 and the drain valve 70 disposed at fluid flow positions between the anode 11 side and the cathode 12 side are opened.

Therefore, the opening of the purge valve 80 and the drain valve 70 may be blocked until the differential pressure becomes the second pressure or more. That is, a fuzzy control or a drain control may be blocked in the duration in which the differential pressure is smaller than the second pressure. As a result, it is possible to prevent the phenomenon in which the air at the cathode 12 side flows back to the anode 11 side, thereby improving the durability of the fuel cell stack 10 and preventing the impurities from being greatly received into the anode 11 side.

When the calculated differential pressure exceeds the third pressure S320, the modifying the target pressure or the RPM of the air compressor 20 (S400) may modify the RPM of the air compressor 20 in order to increase the rising gain value of the RPM of the air compressor 20 or the air supply Stoichiometry Ratio (SR) (S420).

The third pressure may be predetermined to an excessive state where the differential pressure is equal to or greater than a normal range. When the calculated differential pressure exceeds the third pressure, the rising gain value G for increasing the RPM of the air compressor 20 and the air supply SR may be increased. That is, it is controlled to modify the RPM of the air compressor 20 rather than correcting to reduce the target pressure of the hydrogen supply.

The rising gain value G for increasing the RPM of the air compressor 20 may be a gain value G multiplied by a difference between the target RPM of the air compressor 20 and the current RPM thereof when the RPM of the air compressor 20 is increased as the air flow rate required by the fuel cell stack 10 increases.

The air supply SR may mean an air flow rate according to the output required by the fuel cell stack 10. That is, as the air supply SR is increased, the air flow rate required by the fuel cell stack 10 may increase, thereby increasing the RPM of the air compressor 20.

Since the hydrogen pressure at the anode 11 side is almost closed to maintain a high pressure state, the responsiveness is fast, while the air pressure at the cathode 12 side has a delay in the responsiveness until following the target RPM of the air compressor 20, and has a delayed time that is actually supplied to the cathode 12 side of the fuel cell stack 10 along the air supply line, such that it is necessary to modify a control of the RPM of the air compressor 20.

The rising gain value of the RPM of the air compressor 20 and the air supply SR may be continuously increased until the differential pressure returns to the normal range. The rising gain value of the RPM of the air compressor 20 and the air supply SR may be repeatedly increased at a predetermined ratio (e.g., 1.1 times or 1.2 times or the like). As a result, it is possible to quickly recover the differential pressure to the normal range when the differential pressure is excessive.

In particular, the modifying the target pressure or the RPM of the air compressor 20 (S400) may modify the RPM of the air compressor 20 only when the RPM of the air compressor 20 increases (S330, S420).

It is less necessary to modify the RPM of the air compressor 20 when a delay occurs due to the reduction in the air flow rate by the rotational inertia of the air compressor 20 in the case that the output is not required by the fuel cell stack 10 or the required output thereof reduces. However, it is necessary to quickly increase the RPM of the air compressor 20 to maintain the differential pressure in a normal state when the required output of the fuel cell stack 10 increases.

Therefore, it is possible to quickly increase the RPM of the air compressor 20 only when the changing rate (changing speed) of the RPM of the air compressor 20 is equal to or greater than X, which is a predetermined changing rate (changing speed) (S330, S420).

Figure 5:
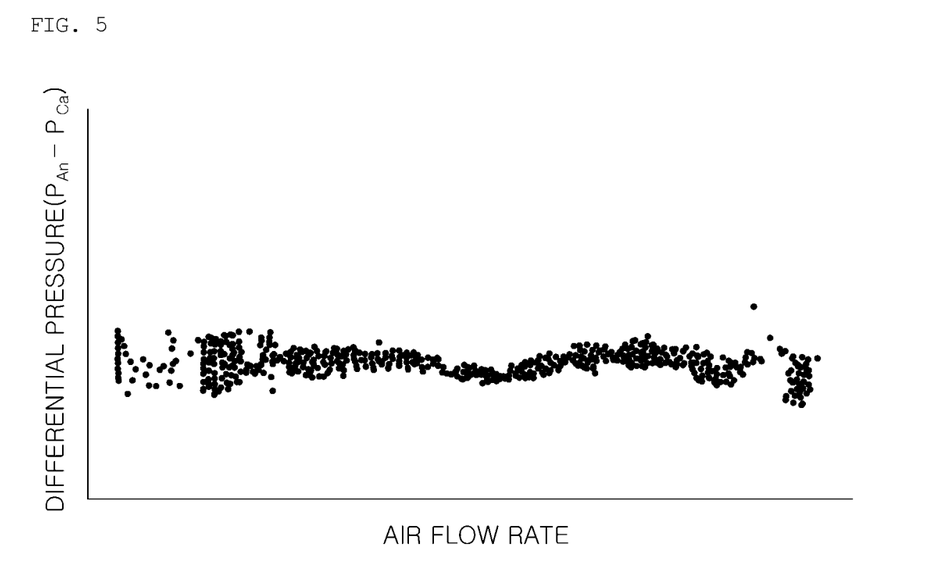
FIG. 5 is a graph illustrating a change in the differential pressure with respect to the air flow rate according to an embodiment of the present disclosure.

FIG. 5 is a graph illustrating a change in the differential pressure with respect to the air flow rate according to an embodiment of the present disclosure. Referring to FIG. 5, according to the present disclosure, it may be confirmed that the differential pressure does not deviate from a certain range as compared to the related art.

In particular, it may be confirmed that the changing width of the differential pressure is maintained to 10 [kPa] or less, which has been more improved than the conventional one, and the phenomenon that the differential pressure greatly increases has been eliminated. In addition, it may be confirmed that the pressure reversal phenomenon in which the differential pressure is reversed has been completely eliminated, which is effective in improving the durability of the fuel cell stack 10.

While it has been illustrated and described with respect to the specific embodiments of the present disclosure, it will be understood by those skilled in the art that various improvement and changes of the present disclosure may be made within the limitation not departing from the technical spirit of the present disclosure as provided by the following claims.

What is claimed is:

1. A pressure control method of a fuel cell stack, comprising steps of:
controlling revolutions per minute (RPM) of an air compressor configured for supplying air to a cathode side of the fuel cell stack and controlling a pressure at an anode side of the fuel cell stack to be a first target pressure based on a required output of the fuel cell stack;

calculating a differential pressure between the anode side of the fuel cell stack and the cathode side of the fuel cell stack; and modifying the first target pressure or the RPM of the air compressor based on the differential pressure, wherein, in the step of modifying, when the differential pressure is smaller than a first pressure, the first target pressure is modified to be a second target pressure by adding a corrected pressure, which has the differential pressure as a variable, to the first target pressure as a variable, and wherein the pressure control method further comprises, after the step of modifying, a step of:

blocking an opening of a purge valve and/or a drain valve, when the differential pressure is smaller than a second pressure, which is predetermined to be smaller than the first pressure, so as to prevent a reversal phenomenon where air at the cathode side flows back to the anode side, wherein the purge valve and the drain valve are disposed at respective lines connecting between an outlet of the anode side and an outlet of the cathode side.

2. The pressure control method of claim 1, wherein, in the step of controlling, the RPM of the air compressor is calculated by an air flow rate according to the required output of the fuel cell stack.

3. The pressure control method of claim 1, wherein, in the step of controlling, the first target pressure is calculated by a predetermined pressure map according to an air flow rate and an air temperature according to the required output of the fuel cell stack.

4. The pressure control method of claim 1, wherein, in the step of calculating, the differential pressure is calculated by measuring a pressure at an inlet of the anode side and a pressure at an inlet of the cathode side of the fuel cell stack by using pressure sensors, respectively, and subtracting the pressure at the inlet of the cathode side from the pressure at the inlet of the anode side.

5. The pressure control method of claim 1, wherein, in the step of modifying, when the differential pressure exceeds a third pressure, the RPM of the air compressor is modified to increase a rising gain value of the RPM of the air compressor or an air supply Stoichiometry Ratio (SR).

6. The pressure control method of claim 5, wherein, in the step of modifying, the RPM of the air compressor is modified only when the RPM of the air compressor increases.

* * * * *